Oct. 10, 1939.　　　P. S. PITTENGER　　　2,176,041
CONTAINER FOR LYOPHILIC BIOLOGICALLY ACTIVE SUBSTANCES
Filed June 25, 1936
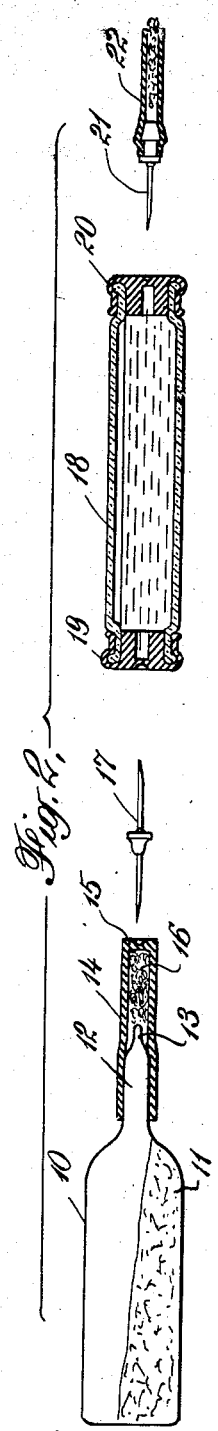
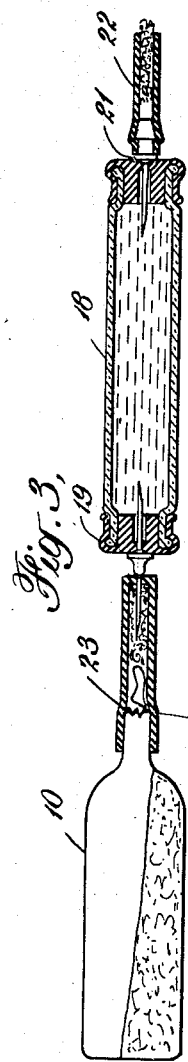
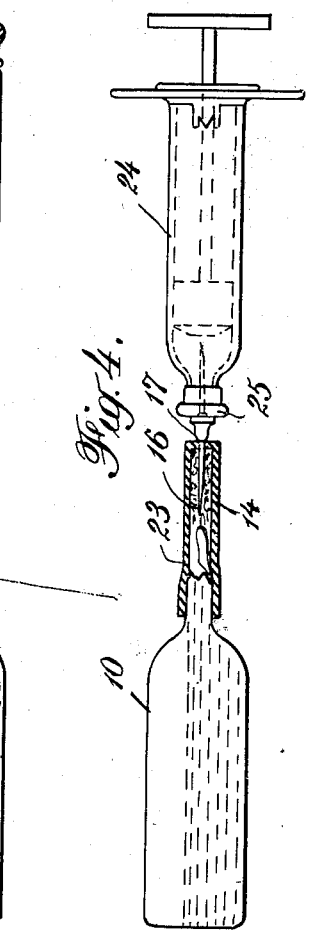
INVENTOR
Paul S. Pittenger
BY
Pennie Davis Marvin & Edmonds
ATTORNEYS Patented Oct. 10, 1939

2,176,041

UNITED STATES PATENT OFFICE 2,176,041

CONTAINER FOR LYOPHILIC BIOLOGICALLY ACTIVE SUBSTANCES

Paul S. Pittenger, Philadelphia, Pa., assignor to Sharp & Dohme, Incorporated (1929), Philadelphia, Pa., a corporation of Maryland Application June 25, 1936, Serial No. 87,319

1 Claim. (Cl. 128—272)

The present invention relates to improvements in the preservation of biologically active substances, such as sera, protein solutions, bacterial cultures, viruses and other labile biological substances; and it relates more particularly to improvements in the containers in which such materials are distributed and stored under vacuum after treating such substances by freezing, and dehydration under a high vacuum to produce a desiccated substance, which containers are provided with means by which water or other aqueous liquid can be readily introduced into the container without destroying the vacuum to restore the desiccated substance to a liquid condition suitable for use.

Biological substances, as now commonly distributed and marketed, are packaged and sealed in a liquid state. Products so marketed and distributed tend to deteriorate and to lose their biological properties, and the marketing of such products in such form involves a serious economic loss, both because of the loss of biological activity or potency of the products between the time of manufacture and the time of use, and because of the large proportion of such products which must be discarded because of deterioration on storage. Such products are commonly sold with a fixed expiration date after which they are not to be used, and a large proportion are not used before their expiration date has passed and must be discarded.

It has been proposed to improve the stability and keeping properties of serum and other biological products by freezing such products and drying, that is, removing water from, the frozen products under a high vacuum, both in bulk and final containers. It has also been proposed to seal such products, after desiccation, in containers under a high vacuum, as by the use of containers having perforable closures to permit the introduction of water into the containers, as by means of a hypodermic needle, without destroying the vacuum to enable the material to be restored to a liquid state suitable for use. Such desiccated material is very porous and it is desirable to package and distribute it under a vacuum, both to prevent any deterioration which might be caused by contact with the air, and to facilitate the dissolving of the material in water or other aqueous fluid when restoration is desired. If the material is maintained under a vacuum, and water is introduced into the container before the vacuum is broken, the vacuum tends to pull the water into the pores and interstices of the material, insuring intimate contact of the water with the material and preventing the material from being impregnated with gas which might tend to prevent the ready access of water to the interior portions of the desiccated material. Methods of producing such desiccated biologically active substances, in final containers, sealed under a high vacuum in containers provided with perforable closures have been developed by Dr. Reichel of the Mulford Laboratories, and Dr. Flosdorf, of the University of Pennsylvania. It has also been proposed to store desiccated biologically active substances in sealed glass ampoules.

In all procedures as have heretofore been proposed for the storage of such materials in containers provided with a glass seal, the method of restoration used involves breaking the glass seal and destroying the vacuum. When the vacuum is destroyed by the breaking of the seal in order to permit the introduction of water, the material, which is very porous and has an immense network of fine pores or capillaries, tends to become air-bound and does not dissolve readily in the water or aqueous liquid used, and must be shaken vigorously or allowed to remain in contact with the water for a considerable period of time, or both, before it dissolves.

The methods heretofore proposed for the sealing of such desiccated biologically active substances in a container provided with a perforable closure have the disadvantage that the perforable seals used are not sufficiently vacuum-tight, and moisture-tight, to insure the maintenance of a high vacuum within the container, to facilitate the restoration of the material to a liquid state, and to prevent the ingress of moisture. The desiccated materials under consideration are very hygroscopic, having a distinct tendency to absorb moisture, even from air of relatively low humidity and, after absorption of moisture, tend to deteriorate. The keeping properties of the material depend to a marked extent upon the degree of desiccation, and any means of sealing the material within a container which does not prevent the ingress of moisture, even in small amounts, with complete reliability, is not altogether satisfactory.

Accordingly, it is the object of the present invention to provide a glass container in which the desiccated biologically active substances are hermetically sealed under a vacuum by means of a glass seal, which is absolutely vacuum-tight and moisture-proof, and to provide means by which water or other aqueous liquid may be introduced to restore the desiccated material to a liquid state without breaking the vacuum within the container.

In accordance with the present invention, a suitable vial or container, preferably cylindrical in shape, with a relatively long tubular neck is provided. The size of the vial may be varied almost at will, its capacity being determined by the amount of material which it is intended to contain and being such as to contain one or more unit portions of the material. Thus the capacity of the container may vary from a fraction of a cubic centimeter to 50 or 100 or more cubic centimeters. The volume of the container, however, must be somewhat more than twice as great as the volume of the material intended to be processed therein, in order to provide adequate surface for the sublimation or evaporation of water therefrom. Thus if unconcentrated material is processed in the container, the container must have a volume of about twice the volume of the final restored product, whereas if concentrated material, such as material which has been concentrated to about one-half volume in a suitable manner, is processed within the container, the container may have an amount of desiccated material within it which on restoration to its normal liquid condition about fills the container. The neck of the container must be of sufficient size to permit the free flow of water vapor during the desiccation process. In carrying out the desiccation, the material is originally frozen by exposure to a refrigerant maintained at a very low temperature, and is then subjected to the action of a high vacuum, the heat absorbed during the sublimation or vaporization which takes place being sufficient to maintain the material in a frozen state despite the flow of heat into the material from the atmosphere or surroundings. In order to maintain the sublimation or vaporization at a sufficient rapid rate to prevent the melting of the material, it is necessary to provide an adequately large passageway for the vapors, and to avoid the use of vapor passages of too small a lumen, or with too many constrictions.

Into the container so provided is introduced the proper amount of biologically active substance to be treated, and this substance is then frozen, preferably while the container is in a more or less horizontal position to insure a maximum exposed surface for sublimation, and by exposure to a refrigerant maintained at a very low temperature, e. g. —70° C. The container is then attached to a vacuum manifold and subjected to the action of a high vacuum to remove the water from the frozen material. After the desiccation has proceeded to the desired extent, the neck of the container is sealed by means of a flame. This sealing may be done without breaking the vacuum, and while the container is still attached to the vacuum manifold, but preferably the container is removed from the vacuum manifold, and the interior of the container allowed to assume atmospheric pressure, after which the neck is drawn in part to a fine tube, the container is once more evacuated, as by connecting it again to a vacuum manifold, and is then flame-sealed at the point where it has been drawn to a fine tube. It is advantageous to draw a portion of the neck at the point of sealing to capillary dimensions, or to a fine tube, before sealing, as this simplifies the sealing operation, and insures the production of a vacuum-tight seal, without risk of puncturing the glass, as frequently occurs when tubes of relatively large diameter, such as are used for the necks of the containers, are flame-sealed under a vacuum.

The desiccated material is thus produced within the container as a formed porous mass, having the shape and volume of the frozen material from which it is produced, and without change in its physical structure after desiccation, having an immense network of capillaries or pores, and sealed within the container under a high vacuum by an all-glass seal. Over the sealed neck of the container is placed a rubber cap or tube having a closed end, within which is a small pad of absorbent cotton or other suitable filtering material. This tube is of proper size to form a tight connection with the neck, and to prevent the leakage of air into the container after the glass seal is broken, for such short periods of time as required in restoring the material.

In order to restore the desiccated material to a liquid state, it is merely necessary to perforate this rubber cap or tube at the closed end by means of a hypodermic needle, break the end of the glass seal with the fingers, and allow water to flow through the needle into the container. The vacuum, which is maintained in the container by the glass seal during storage, etc., and during the short period of restoration by means of the rubber cap, quickly sucks the water into the container and insures its rapid penetration into the desiccated material and the rapid solution of it.

To remove the restored material from the container, it is merely necessary to allow a little air to enter, in order that the vacuum will not prevent the removal of the material, and then to suck the liquid material out of the container as with a hypodermic syringe, the needle of which is introduced through the end of the rubber cap or tube. The cotton or other filtering material within the rubber cap serves to filter the restored material as it is withdrawn from the container, and to prevent any particles of broken glass from entering the syringe through the needle.

The invention will be further illustrated and explained in connection with the drawing, which illustrates a container with the desiccated material in it, and the rubber cap and other means used in restoring the material and in removing the restored material from the container.

In the drawing,

Fig. 1 illustrates a glass container containing the desiccated material;

Fig. 2 illustrates a container containing the material fitted with a rubber cap and means by which the material may be restored to a liquid state without breaking the vacuum, the parts being separated;

Fig. 3 illustrates a container with means for restoring the material assembled, and with the glass seal broken; and Fig. 4 illustrates the container and cap after the material has been restored to a liquid state with a hypodermic syringe suitable for the introduction of liquid and for the withdrawal of the restored material attached.

In Fig. 1, 10 represents a vial or container of suitable size intended for the marketing or distribution of a desiccated serum or other biologically active substance, containing a frozen and desiccated biologically active substance 11. The container is provided with a neck 12 of suitable size to permit the ready flow of water vapor, which is flame-sealed, after the material is desiccated and while a vacuum is maintained within the container, as shown as 13. The desiccated biologically active substances are produced in the container by introducing into the container a suitable amount of a liquid biologically active substance, freezing the liquid substance as by indirect exposure to a refrigerant maintained at a very low temperature, e. g., −70° C., preferably while the container is in a more or less horizontal position to provide a maximum surface area of the frozen material, and removing the frozen water by evaporation or sublimation, by means of a high vacuum at a rate sufficient to prevent the material from assuming a liquid or gelatinous condition. The neck 12 of the container must be sufficiently large so that a free flow of water vapor is obtained, so that the cooling effect of the vaporization or sublimation is sufficient to prevent the melting or softening of the material during the desiccation.

After the desiccated substance is produced, and sealed under a high vacuum as shown in Fig. 1, a rubber cap or tube 14, which tightly embraces the neck 12, is placed on the neck as shown in Fig. 2. This rubber cap or tube has a closed end 15, and contains a suitable filtering material, such as absorbent cotton 16. The rubber cap may advantageously be protected from deterioration by providing a glass cap (not shown) for it, which will prevent contact of air with the rubber and which may be easily removed when it is desired to use the material in the container.

To restore the material, there may be advantageously provided a hollow needle, similar to the needle of an ordinary hypodermic syringe, which is double-ended, and a suitable container or tube 18 for the water or other aqueous liquid used to restore the material. This container may be a glass tube open at either end and provided with perforable rubber stoppers 19 and 20 at each end. Another needle 21, and a suitable air filter attached thereto is also provided.

In order to restore the material to a liquid state, the needle 17 is forced through the end of the rubber cap or tube 14, and also through the perforable stopper of the container 18. Needle 21, with its attached air filter 22, is forced through the other perforable stopper of the container 18. The neck 12 of the container 10 is then broken as shown at 23, as by the fingers, whereupon the vacuum which exists in the container 10 sucks the water in container 18 into container 10, so that the water quickly wets the desiccated material, thoroughly permeating the pores and capillaries, and rapidly dissolves it. The amount of water which is contained in the container 18 may advantageously be that which should be added to insure that the restored material has the proper concentration.

After the material is restored to a liquid state, the tube 18 is removed and sufficient air will enter the container 10 to permit the subsequent removal of the liquid material by use of an ordinary hypodermic needle and syringe. During the removal of the liquid by the syringe, the filtering material 16 will effectively filter the material and will also prevent any small particles of glass from entering the syringe along with the restored material.

If desired, instead of using the tube 18 for the water or other liquid to restore the material, the water or other liquid may be supplied in a syringe such as shown in Fig. 4. In this case, to restore the material, needle 17 is passed through the rubber cap 14 and through the perforable stopper 25 provided in syringe 24. The neck of the container is then broken, and the vacuum in the container sucks the water from the syringe into the container, so that the desiccated material is dissolved. The syringe is then removed for a short time to permit air to enter the container, and the syringe then is used to withdraw the restored material from the container and is used as an ordinary hypodermic syringe.

It will thus be seen that by the present invention I provide means by which desiccated biologically active substances may be produced in a container having an all-glass seal such that the material is effectively maintained under a vacuum and effectively preserved from the effects of moisture or any contaminating agents, and yet may be restored to a liquid state by the addition of water or other aqueous liquid while the desiccated material is maintained under a vacuum, so that the restoration to a liquid state is simplified and speeded up.

I claim:

As a new article of manufacture, a sealed evacuated container containing a desiccated biologically active substance, said desiccated biologically active substance having a formed porous structure of substantially the volume and shape of the frozen material from which it is produced, said container having a flame-sealed neck and a rubber cap with filtering material in said cap over said neck, said cap being adapted to be perforated by a hollow needle, whereby the flame-sealed neck may be broken within said cap and water or other liquid introduced into said container without destroying the vacuum within the container.

PAUL S. PITTENGER.